United States Patent
Leen et al.

(10) Patent No.: US 10,768,905 B2
(45) Date of Patent: Sep. 8, 2020

(54) SYSTEMS, METHODS, AND APPARATUSES FOR IMPLEMENTING SCHEMA-DRIVEN ON-THE-FLY CODE GENERATION WITHIN A CLOUD BASED COMPUTING ENVIRONMENT

(71) Applicant: salesforce.com, inc., San Francisco, CA (US)

(72) Inventors: John Michael Leen, Seattle, WA (US); Bhadri N Venkatesan, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/421,161

(22) Filed: Jan. 31, 2017

(65) Prior Publication Data

US 2018/0217819 A1 Aug. 2, 2018

(51) Int. Cl.
*G06F 8/34* (2018.01)
*H04L 29/08* (2006.01)
(Continued)

(52) U.S. Cl.
CPC ............... *G06F 8/34* (2013.01); *G06F 8/20* (2013.01); *G06F 8/30* (2013.01); *G06F 8/41* (2013.01); *H04L 67/02* (2013.01)

(58) Field of Classification Search
None
See application file for complete search history.

(56) References Cited

U.S. PATENT DOCUMENTS 5,577,188 A 11/1996 Zhu
5,608,872 A 3/1997 Schwartz et al.
(Continued)

*Primary Examiner* — Duy Khuong T Nguyen
*Assistant Examiner* — Mark A Gooray
(74) *Attorney, Agent, or Firm* — Elliot, Ostrander & Preston, P.C.

(57) ABSTRACT

In accordance with disclosed embodiments, there are provided systems, methods, and apparatuses for implementing schema-driven on-the-fly code generation within a cloud based computing environment. For instance, an exemplary system having at least a processor and a memory therein includes means for: designing an application having a plurality of method calls to perform functionality for the application; defining at least one of the plurality of method calls as a web service identified by a web service URL; retrieving a schema for the web service via the web service URL; parsing the schema to identify a plurality of methods provided by the web service and generating a list of all the methods for the web service; persisting the list of all the methods for the web service in a database system communicably interfaced with the system; exposing a class corresponding to each one of the plurality of methods provided by the web service, the exposed classes referencing the methods persisted in the database system; loading all classes required by the application including any of the exposed classes corresponding to the plurality of methods provided by the web service referenced by the application; and executing the application, in which any call to one of the plurality of methods provided by the web service includes initiating a network call to invoke the web service. Other related embodiments are disclosed.

25 Claims, 9 Drawing Sheets

(51) Int. Cl.
*G06F 8/30* (2018.01)
*G06F 8/20* (2018.01)
*G06F 8/41* (2018.01)

(56) References Cited

U.S. PATENT DOCUMENTS

| | | | |
|---|---|---|---|
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,289,976 B2 | 10/2007 | Kihneman et al. | |
| 7,340,411 B2 | 3/2008 | Cook | |
| 7,620,655 B2 | 11/2009 | Larsson et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050575 A1 | 3/2005 | Exley et al. | |
| 2005/0091098 A1 | 4/2005 | Brodersen et al. | |
| 2006/0155817 A1* | 7/2006 | Desai | G06F 17/30861 709/208 |
| 2007/0157096 A1* | 7/2007 | Keren | G06F 8/34 715/760 |
| 2009/0177744 A1 | 7/2009 | Marlow et al. | |
| 2010/0199169 A1* | 8/2010 | Gnech | G06F 17/30893 715/234 |
| 2011/0246555 A1* | 10/2011 | Hedges | G11B 27/034 709/203 |
| 2014/0359578 A1* | 12/2014 | Jesse | G06F 8/61 717/124 |
| 2015/0193808 A1* | 7/2015 | Wade | G06Q 30/0241 705/14.49 |
| 2016/0148115 A1* | 5/2016 | Sirosh | G06N 99/005 706/11 |

* cited by examiner

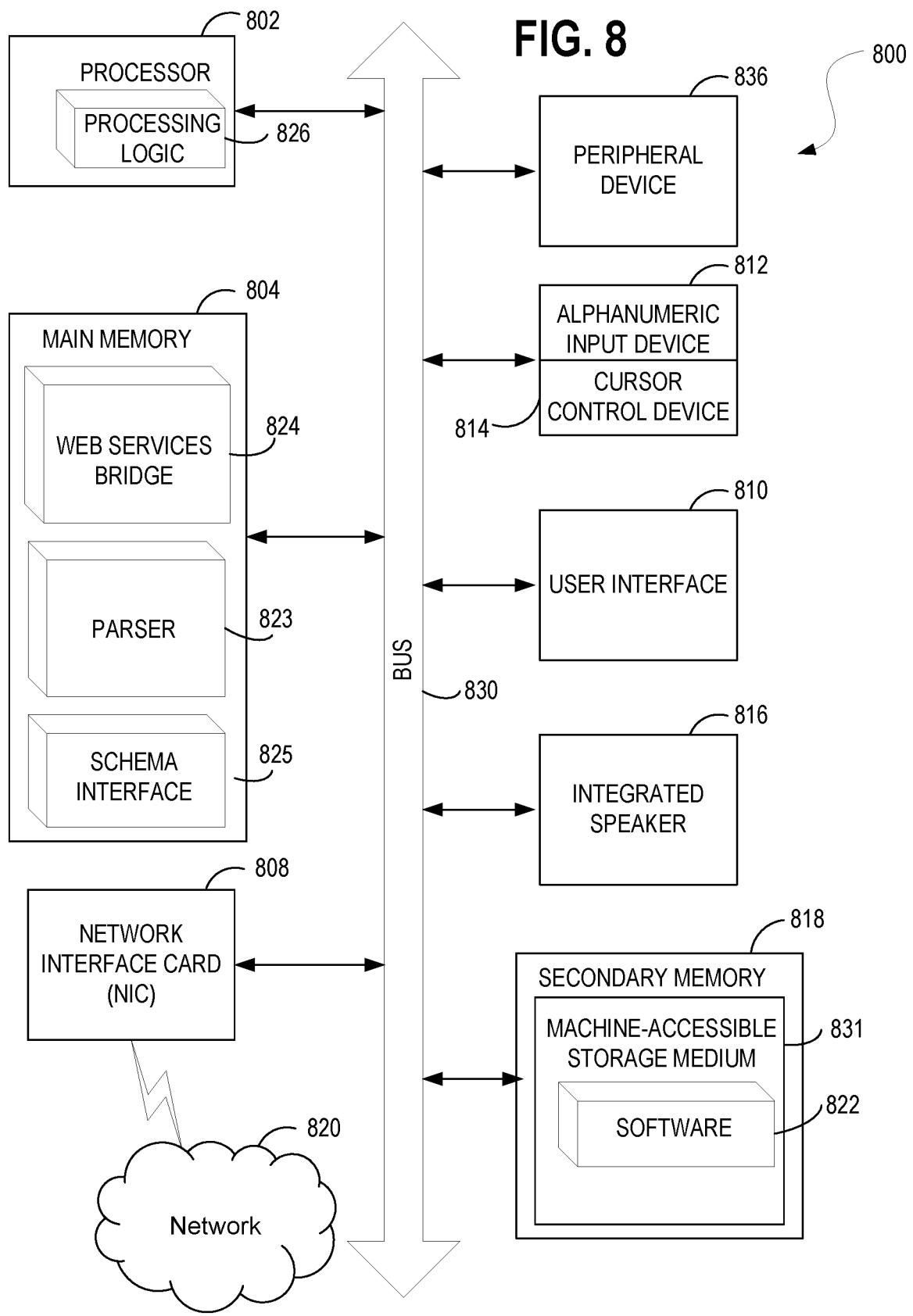

SYSTEMS, METHODS, AND APPARATUSES FOR IMPLEMENTING SCHEMA-DRIVEN ON-THE-FLY CODE GENERATION WITHIN A CLOUD BASED COMPUTING ENVIRONMENT

CLAIM OF PRIORITY

None.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of computing, and more particularly, to systems, methods, and apparatuses for implementing schema-driven on-the-fly code generation within a cloud based computing environment such as a database system implementation supported by a processor and a memory to execute such functionality. Such means may be implemented within the computing architecture of a hosted computing environment, such as an on-demand or cloud computing environment which utilizes multi-tenant database technologies, client-server technologies, traditional database technologies, or other computing architecture in support of the hosted computing environment.

BACKGROUND

The subject matter discussed in the background section is not to be assumed as prior art merely as a result of its mention in the background section. Similarly, a problem mentioned in the background section or associated with the subject matter of the background section is not assumed to have been previously recognized in the prior art. The subject matter in the background section merely represents different approaches, which in and of themselves may also correspond to claimed embodiments.

Web services platforms provide a multitude of services which are typically offered by one computing system to another computing system or electronic device over a public Internet, such as the World Wide Web. In a Web service, Web technology such as HTTP, originally designed for human-to-machine communication, is utilized for machine-to-machine communication, and very often for transferring machine readable file formats such as XML and JSON. In practice, the web service typically provides an object-oriented web-based interface to a database server, utilized for example by another web server, or by a mobile application, which then in turn provides a user interface to an end user. So called mashups are also commonly provided to end users, in which a web server consumes several web services originating potentially from multiple different machines, and aggregates all of the content into one user "mashed up" or aggregate user interface.

The World Wide Web Consortium (W3C) operates as the main international standards organization for the World Wide Web (abbreviated WWW or W3) and defines a web service as " . . . software system designed to support interoperable machine-to-machine interaction over a network."

Within a cloud computing environment, there are developers which utilize the cloud computing environment to host their code base and execute applications which are then exposed via the public Internet to end users. However, there exists a large number of different cloud computing environments within which the developers may provide software and it is often the case that developers are developing and executing software within multiple disparate and distinct cloud computing environments, each of which may be incompatible with one another.

Such developers are seeking improved means by which they may integrate software and other code elements between multiple distinct cloud computing environments, notwithstanding the technical incompatibilities.

One solution is to simply "port" the various applications, however, this inevitably requires substantial time investment from the developers to copy and then alter their code for the target platform so as to account for inconsistent behavior and syntax. Further time and costs are then involved as the developer porting such applications must then perform necessary testing and ultimately maintenance of multiple code bases which then diverge from one another over time.

Such a solution both undercuts customers' ability to choose their preferred web services platform based on their particular needs and further undermines the ability of the services provider offering the cloud based computing environment to compete effectively for certain customers having established code bases which are incompatible with the offered web services platform.

The present state of the art may therefore benefit from the systems, methods, and apparatuses for implementing schema-driven on-the-fly code generation within a cloud based computing environment as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 8 illustrates a diagrammatic representation of a machine in the exemplary form of a computer system, in accordance with one embodiment.

DETAILED DESCRIPTION

Figure 1:
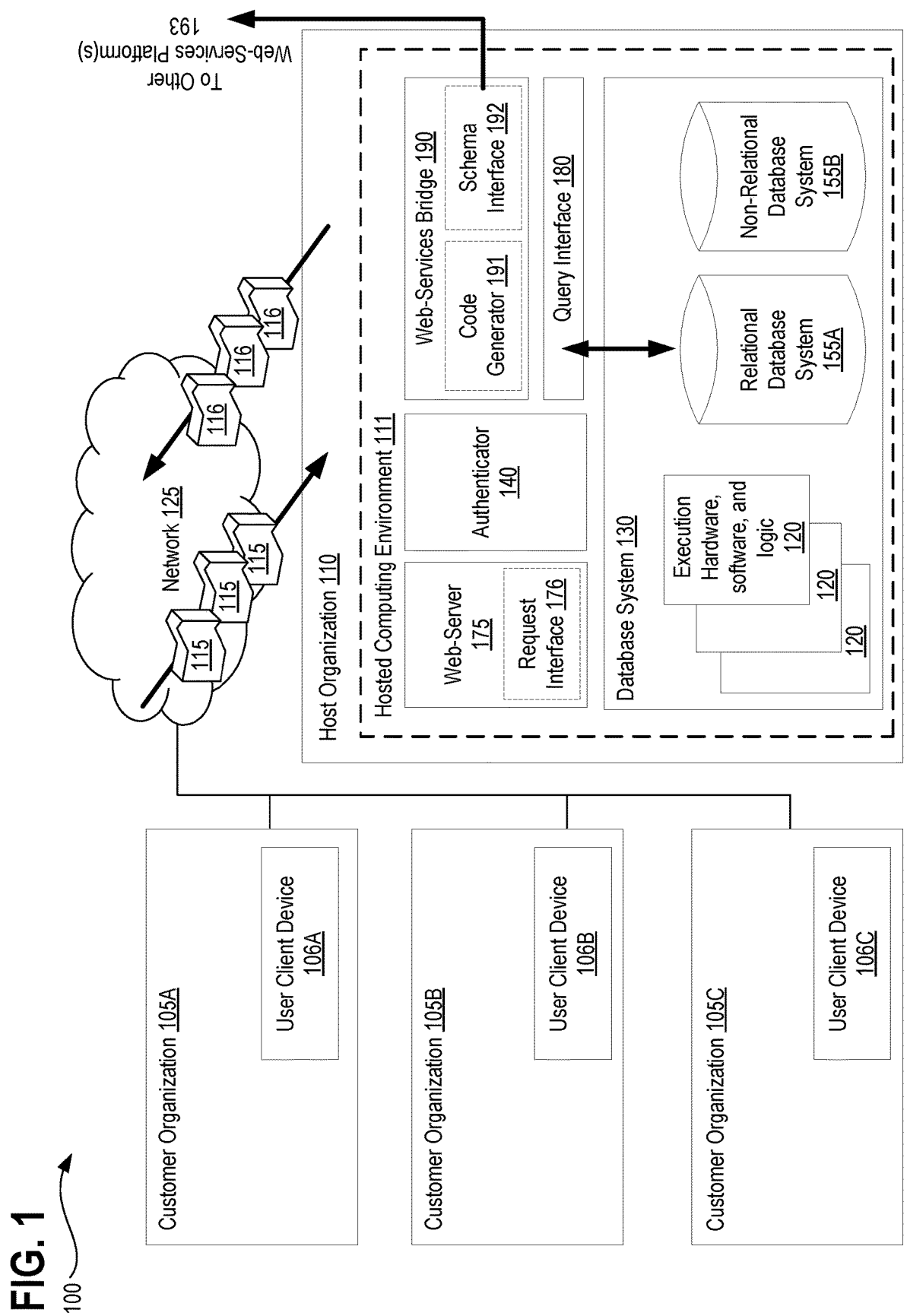
FIG. 1 depicts an exemplary architecture in accordance with described embodiments.

Described herein are systems, methods, and apparatuses for implementing schema-driven on-the-fly code generation within a cloud based computing environment. For instance, such an exemplary system having a processor and a memory therein includes means for designing an application having a plurality of method calls to perform functionality for the application; defining at least one of the plurality of method calls as a web service identified by a web service URL; retrieving a schema for the web service via the web service URL; parsing the schema to identify a plurality of methods provided by the web service and generating a list of all the methods for the web service; persisting the list of all the methods for the web service in a database system communicably interfaced with the system; exposing a class corresponding to each one of the plurality of methods provided by the web service, the exposed classes referencing the methods persisted in the database system; loading all classes required by the application including any of the exposed classes corresponding to the plurality of methods provided by the web service referenced by the application; and executing the application, in which any call to one of the plurality of methods provided by the web service includes initiating a network call to invoke the web service.

Customers may utilize different web services platforms yet nevertheless desire to aggregate components from the different systems within a single application. In some instances, this may require calling functionality on a remote platform for execution at a local web-services platform or calling functionality at a remote platform which is to then return results to the local web services platform.

Unfortunately, customers which run application code on multiple disparate web services platforms are confronted with a significant hurdle when seeking to integrate functionality from the two or more web services platforms. Such hurdles may include, for instance, implementing significant boilerplate to enable the remote functionality to operate on the local web services platform. Unfortunately, such efforts are not value add for the developer given that the functionality already exists and merely needs to be enabled at a different location and on a different platform.

For instance, consider a developer seeking to utilize a web service protocols to communicate back and forth between two applications hosted by two disparate web services platforms. Enabling such communication requires the writing, testing, and maintenance of boilerplate code on both ends, at each of the two web services platforms, thus increasing the technical complexity and the time investment required to successfully enable such an integration.

This is contrary to the goals of the host organization, however, which generally seeks to enable a greater scope of functionality and services to a wider audience by lessening the technical complexity required by its users and developers. While many tasks remain complex and may remain so into the future, automating and simplifying the ability for users and web services developers to integrate communications between applications at multiple web services platforms will greatly expand the scope of functionality accessible to even the most novice users and improve the competitive advantages of the host organization offering such web services as there will result a lower barrier to using such services provided by the host organization.

It is therefore in accordance with described embodiments that an automated system is provided which permits users to select programs or applications at each of the two clouds (e.g., each of the web services platforms) which are to communicate with one another and then enable such communications without requiring such users to program or maintain any boilerplate code whatsoever and without having to execute tools to generate such code manually which must then be integrated into the respective applications at each of the web services platforms.

Implementing so called schema-driven on-the-fly code generation within a cloud based computing environment thus enables users to activate such communications between disparate application seamlessly and with the underlying code generation being wholly invisible to the user or developer.

Consider for instance a developer having application code hosted at the Heroku cloud platform and also having application code hosted at the force.com cloud platform. Such a developer using the embodiments as described herein may simply select each of the two applications, or functionality exposed by each of the two applications via an inter-agent schema interface which is capable of communicating with each of the two web-services platforms and then use the methodologies as described herein to automatically connect the two applications or functionality exposed by the two applications. In such an embodiment, the system performs the necessary code generation automatically to carry out the necessary communication interfaces between the two disparate applications without the developer having to write the boilerplate code or even possesses the technical know-how to carry out such a process manually.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary architecture 100 in accordance with described embodiments. In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records with user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

In certain embodiments, a client-server computing architecture may be utilized to supplement features, functionality, or computing resources for the database system 130 or alternatively, a computing grid, or a pool of work servers, or some combination of hosted computing architectures may be utilized to carry out the computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 utilizes the underlying database system implementations 155A and 155B to service database queries and other data interactions with the database system 130 which communicate with the database system 130 via the query interface. The hardware, software, and logic elements 120 of the database system 130 are separate and distinct from a plurality of customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

Further depicted is the host organization 110 receiving input and other requests 115 from a plurality of customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155 or the query interface 180, pursuant to which results 116 are then returned to an originator or requestor, such as a user of one of a user client device 106A-C at a customer organization 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user user client device 106A-C or machine originating such data requests 115.

The query interface 180 is capable of receiving and executing requested queries against the databases and storage components of the database system 130 so as to return a result set, response, or other requested data in furtherance of the methodologies described. The query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C.

Authenticator 140 operates on behalf of the host organization to verify, authenticate, and otherwise credential users attempting to gain access to the host organization.

Still further depicted within the hosted computing environment 111 is the web-services bridge 190 having therein both a code generator 191 and also a schema interface 192 (also referred to as an inter-agent schema interface) capable of communicating with other web-services platform(s) 193 which regardless of whether such web-services platforms are hosted by the same host organizations 110 or hosted by different host organizations.

Figure 2:
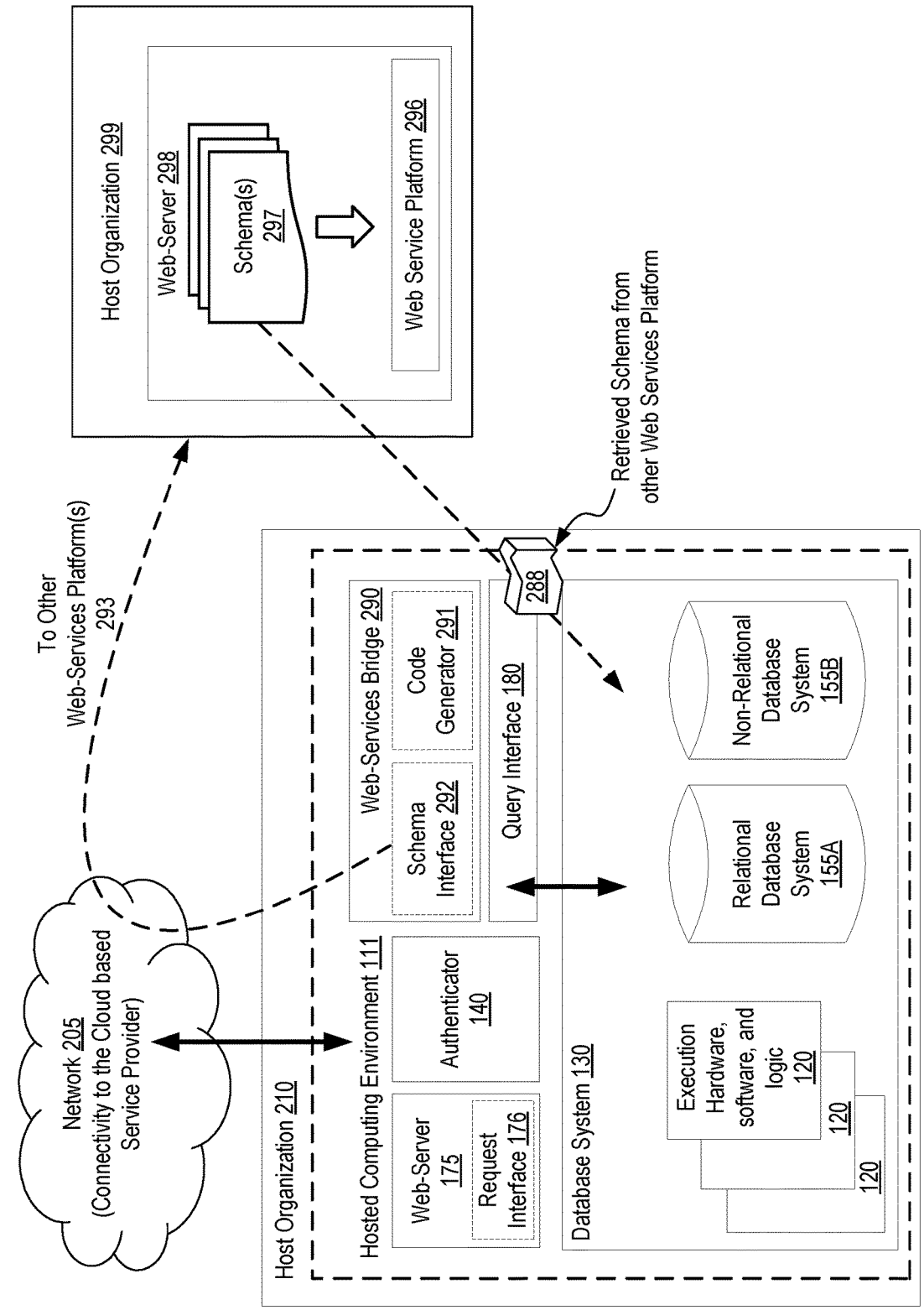
FIG. 2 depicts another exemplary architecture in accordance with described embodiments.

FIG. 2 depicts another exemplary architecture 200 in accordance with described embodiments.

Again depicted here is the host organization 210 communicably interfaced to its customers via network 205 providing connectivity to the cloud based service provider by which the host organization 110 provides cloud services, also referred to as on-demand services, as the host organization 110 makes its various services, hardware, and software available to customers via the "cloud" through network 205.

Within the host organization 210 is the hosted computing environment 111 and the variously provided components described above, however, the web-services bridge 290 is now described in greater detail.

More particularly, it may be observed within the database bridge 290 that the schema interface 292 is communicably interfaced with other web-services platforms 293 and it is now specifically depicted that a second host organization 299 exists having therein a web-server 298 implementing a web service platform 296 for which the variously provided web services of the second host organization 299 operate according to variously defined schema(s) 297.

For web-services developers or users of the host organization seeking to deploy and integrate web-services, the design time experience includes selecting, designing, possibly programming, and deploying or releasing an application or some web-services functionality. Once deployed the functionality then is said to be executed at runtime.

Therefore, developers utilize a developer platform within the host organization to build their code and then permit the functionality to be utilized at runtime.

The distinctions between a development phase and runtime are well known to developers, however, the described embodiments permit developers to communicably and functionally link already running applications (e.g., those applications having been previously developed and deployed and are now accessible as executing runtime applications) without having to undergo additional development processes to link them.

For instance, functionality and applications implemented on, for example, force.com which is hosted by the first computing environment 111 may be functionally and communicably linked to another cloud based computing platform, such as the web service platform 296 operating at host organization 299, such as Heroku.com.

Despite the functionality and applications already operating within a runtime state and exposed and available at each of the first and second host organizations 210 and 299, the web-services bridge 290 operates to capture the necessary schema 297 for the functionality hosted at the other web-services platform 296 operating within host organization 299 and then automatically generate via the code generator 291 the requisite code to permit the two applications or the two sets of functionality at the respective host organizations to communicate with one another. While additional cloud based platforms are not expressly shown here, the web-services bridge 290 may likewise communicate with and generate the necessary code to link functionality from any number of other web-services platforms 293.

According to described embodiments, all web-services, regardless of where they are hosted, are defined via service schema 267. The schema 297 simply provides a description and of what the web service is and what the web service can do, as well as defining how to interact with the web service, akin to a function header or analogous to a listing of callable methods.

According to such embodiments, where a web-service exists and has been deployed and is therefore operating within its runtime phase and therefore exposed and accessible as a web-service, a schema 297 will exist which defines the particulars of that particular web service in a structured and standardized manner.

Consider therefore a force.com developer having functionality at the host organization 210 wishing to integrate with functionality provided by a Heroku service at host organization 299. Conventional systems require the developer to manually write tedious boilerplate code permitting the two systems to interact. Conversely, the web-services bridge 290 permits the developer at host organization 210 to identify to the web-services bridge 290 (e.g., via a developer platform GUI, etc.) the target functionality at host organization 299 by aiming or directing the web-services bridge 290 to the host organization 299 via a web services URL pointing the web-services bridge 290 to the other web-services platform 293. The term URL stands for "Uniform Resource Locator" which is a reference to or an address for a resource on the public Internet.

In accordance with one embodiment, the web services URL takes the following format:

http://servername/vdir/webservicename.asmx/
Methodname?parameter=value

According to such an embodiment, servername identifies the name of the server upon which the target Web service is deployed; apppath represents the name of a virtual directory and the remainder of the Web application path to the web service; webservicename.asmx represents the name of the target Web service .asmx file; methodname represents the name of a public method that is exposed by the target Web service; and parameter represents an appropriate parameter name and value for any parameters required by the specified method of the target web service.

Once identified, the web-services bridge 290 will automatically retrieve the provided schema 297 for the identified web service from the web-service platform 296 at host organization 299 utilizing the web-services URL. The retrieved schema from the other web services platform depicted via the return arrow at element 288 is then persisted in the local database system 130 of the host organization 210 on behalf of the web-services bridge 290.

Figure 3:
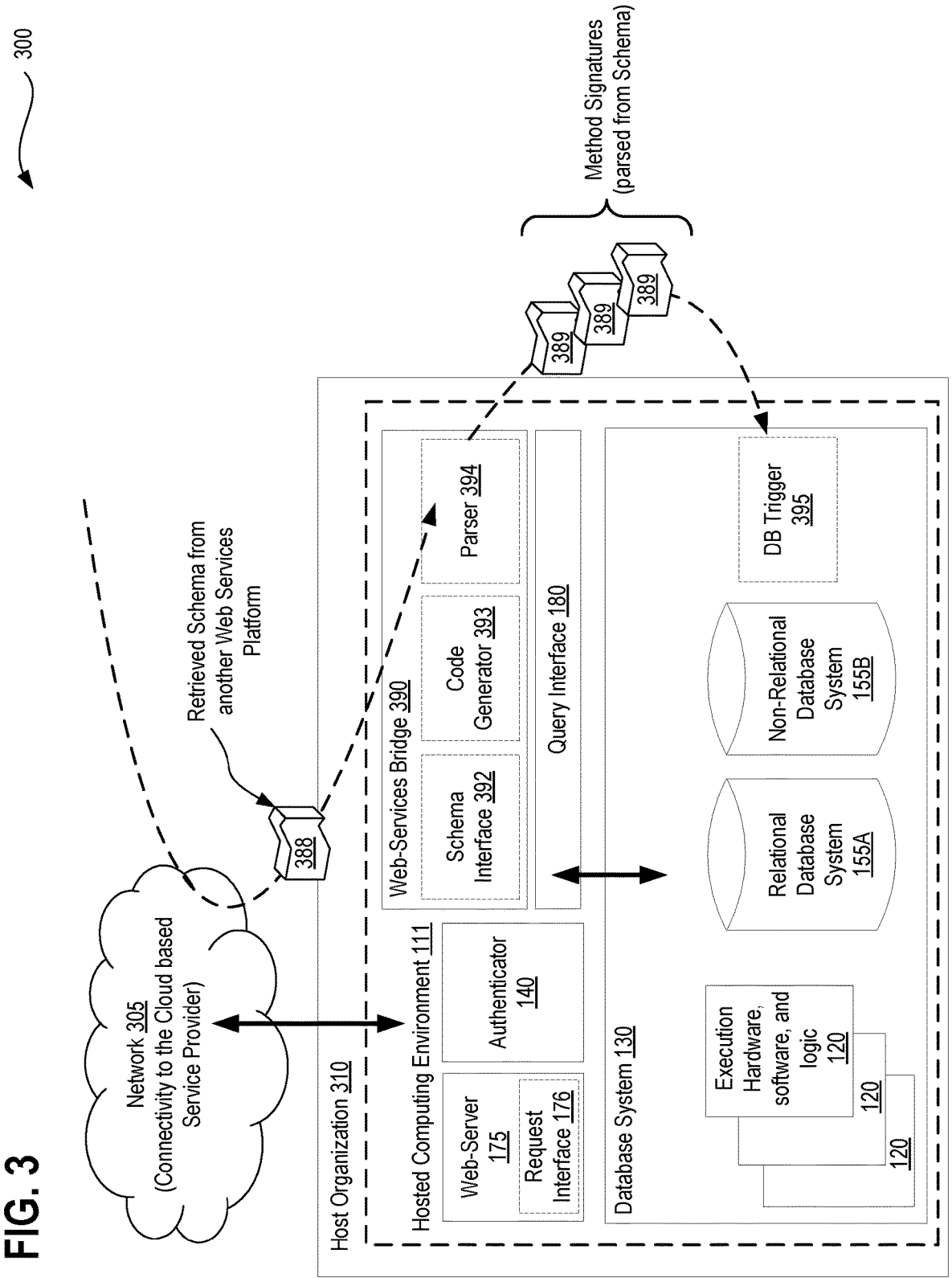
FIG. 3 depicts yet another exemplary architecture in accordance with described embodiments.

FIG. 3 depicts yet another exemplary architecture 300 in accordance with described embodiments.

Again depicted here is the host organization 310 communicably interfaced to its customers via network 305 providing connectivity to the cloud based service provider by which the host organization 310 provides cloud services, also referred to as on-demand services, as the host organization 310 makes its various services, hardware, and software available to customers via the "cloud" through network 305.

Also depicted here is the retrieved schema from another web services platform 388 coming into the host organization 310 and specifically into the parser 394 now depicted at the web-services bridge 390.

The parser 394 operates within the web-services bridge 390 according to the depicted embodiment in conjunction with the schema interface 392 which retrieves the schema from the other web service platform and the code generator 393 which produces the necessary code on behalf of the developer to functionally and communicably link the two respective applications or functionalities hosted at the disparate web services platforms.

As shown here, the parser 394 digests the incoming schema 388 retrieved from another web services platform and breaks it down utilizing the schema's 388 published specification for the remote functionality or application to be linked with the locally hosted functionality or application, identifying all available method signatures 389 as parsed from the schema 388 and writing those method signatures 389 into the database system 130.

According to an alternative embodiment there is a database trigger 395 operating within the database system 130. In such an embodiment, when the retrieved schema 388 from another web services platform arrives at the database 130, it is the DB trigger 395 which initiates the parsing of the schema 388 and identifies the respective method signatures 389 for storage within the database system 130. According to such an embodiment, the parser 394 of the web-services bridge 390 may be replaced entirely by the DB trigger 395 within the database system 130.

Regardless of how parsed, the method signatures 389 are stored within the database system 130 and available for use with functionally and communicably linking the functionality or application from the other web services platform as described by the retrieved schema with the application or functionality hosted by the host organization 310.

It is therefore in accordance with such embodiments that a developer may specify functionality from another webservice to be utilized with the developer's own application, compiled and deployed, and even where the developer's application has been deployed and is operating within a runtime state, the runtime application will utilize the latest and most up-to-date functionality from the linked webservice application as that application is also operating in its runtime state and will therefore operate in accordance with its latest deployed version regardless of when the schema may have been retrieved. Such utilization is entirely seamless to the developer who is not required to write any additional code or even re-release the previously deployed application. Rather, the application may simply remain within its runtime state and benefit from any updates or modified behavior of the linked web-services application.

According to one embodiment, the method signatures 389 are stored within the database system 130 in a format which mimics resident or locally stored classes such that they may be browsed via a class browser, process builder, flow builder, etc., and referenced, called, and utilized by application code as if they were locally available classes. According to such an embodiment, the parser 394 or the DB trigger 395 generates a class structure and emits code into the save database entry representing each respective method signature 389 parsed from the schema 388 which permits the methods of the schema 388 to be called as a native and local class, but which will then institute the necessary communications to the remotely hosted web-services platform where the targeted web-service from which the method signatures 389 originate actually reside and are operating. Stated differently, the functionality behind the method signatures 389 is not copied to or hosted at the host organization 310, but rather, a shell or structure mimicking a callable class is stored within the database system 130 of the host organization which then makes the necessary communications to the other web services platform which then carries out the described functionality published with the schema 388.

Conventional solutions required the functionality to be copied and stored locally and then method calls to the remote web services platform were in reality local calls to a local copy of the functionality provided by the web services platform. Unfortunately, such an approach required maintenance as any changes at the source are not reflected by the locally stored copy of the functionality and thus creates duplication and wastes developer resources. Conversely, where the method signatures 389 are stored locally but the functionality called executes at the other web services platform from which it originated, any changes will immediately be reflected at both the remote web services platform being called and the local web services platform making the call as there is in fact only a single copy of the functionality being executed and therefore, it simply is not possible for the local and remote web services to become out of synchronization.

According to another embodiment, the originally retrieved schema 388 is additionally stored within the database 130 in its original format so that the parser 394 or database trigger 395 may re-generate the stored method signatures 389 at any time or alternatively may generate new method signatures 389 or corresponding classes at any time, for instance, in a new or different format in support. According to a particular embodiment, the originally retrieved schema is stored as a Base Platform Object (BPO) as retrieved from the other external web-services platform and persisted locally at the database system 130 of the host organization 310.

According to certain embodiments, the parser 394 or the DB trigger 395 implement Just-In-Time or JIT compilation, also referred to as dynamic translation, to generate the callable methods or classes. According to other embodiments, the code generator 393 utilizes JIT compilation to generate the necessary code to call the remotely hosted web-service functionality.

Generally speaking, JIT type compilation is performed during execution of a program—at runtime—rather than prior to execution, however, variations also provide for compilation just prior to execution. For instance, higher level application code may be translated to machine code for a specific target machine type, which may then be executed directly. Alternatively, higher level application code may be translated to an intermediate format which is then compiled to machine code during or just prior to execution by a target machine.

According to certain embodiments, code generation performed on a JIT compilation basis such that the actual code generation is deferred until just before the code needs to be run. Because the compilation or interpretation of the code is deferred, it is possible to change the code generation logic at the parser 394 or the DB trigger 395 such that it will generate different code as circumstances warrant.

In yet another alternative embodiment, the web-services bridge 390 will periodically re-retrieve the schema 388 and re-parse the schema 388 which will permit any newly developed and exposed methods to be identified and then stored as new browse-able method signatures 389 and classes within the database system 130, for instance, via a flow builder and a process builder, such as a flow interview GUI.

For instance, while the functionality is controlled at the other web service platform where the functionality is hosted, it may be necessary to re-parse the schema or re-parse a newly retrieved schema at the parser 394 or re-generate the code which communicably and functionally links the application at the host organization to the application at the other web services platform. For example, it may be desirable to improve the way web services get called from the host organization or there may be a performance improvement to the schema is parsed and stored as method signatures 389 or, for example, converted from Apex type code variables into, for example, to web service invocations.

According to one embodiment, all the stored schemas 388 in their original form may be retrieved from the database system 130 and re-parsed in bulk. In another embodiment, the stored schemas 388 are re-retrieved from their source web service platform and re-parsed in bulk.

According to one embodiment, only a list of available method signatures is stored and persisted in the database system 130 along with where to find them, such as at what external web service such method signatures may be resolved so as to carry out the functionality lacking from the local host organization but nevertheless associated with such method signatures persisted by the host organization via external functional calls to web services hosted at other web service platforms.

According to a particular embodiment, a callable class or a saved method signature within the database 130 includes names of methods as well as the names of arguments and types of arguments permissible for any given method name identified. According to such an embodiment, however, there is no implementation of the functionality provided at the host organization 110, rather, the method name, arguments, and argument types are utilized by the code generator 393 to make a call to the web service at another web-services platform to perform the requested functionality. According to such an embodiment a marshalling process is performed in which the method name, arguments, and argument types are parsed from the schema 388 by the parser 394 or DB trigger 395 and are utilized to represent a complete class to a class browser or other flow builder or process builder GUI for selecting the classes, notwithstanding the lack of any functional code to actually implement the callable methods.

Because the method signatures 389 are stored by the database system 130 of the host organization, the developer may browse through the available methods and their externally facing interfaces and simply select which to use with the locally developed application.

The developer may alternatively refer to the exposed methods as classes when writing code manually. For instance, when writing Apex code, Apex may permissibly refer to the method signatures as classes, without Apex requiring any knowledge that the functionality of such "classes" actually refers to methods of a remotely hosted web-service.

Regardless of how invoked the available methods may be browsed as they are stored locally within the database system 130. Once the desired methods have been selected or invoked within the application, the developer may compile and deploy the application such that it is accessible and operating in a runtime state as an exposed web-service having embedded therein functional links to another web-service through the class invocation or method calls as if that functionality existed within the host organization 310.

For instance, rather than being a source class which is loaded at runtime, an algorithm is invoked utilizing the schema information from the saved method signature to translate the schema information into generated code that marshals the requisite arguments, method name, and proper argument types for the target web service and then actually accesses the web or public Internet to call upon the external web service.

According to a particular embodiment, the code generation creates the code on the fly at runtime to marshal the variables and call the external web-service and then discards the generated code. According to another embodiment, the generated code is cached temporarily, but subsequently discarded and never persistently stored.

Figure 4:
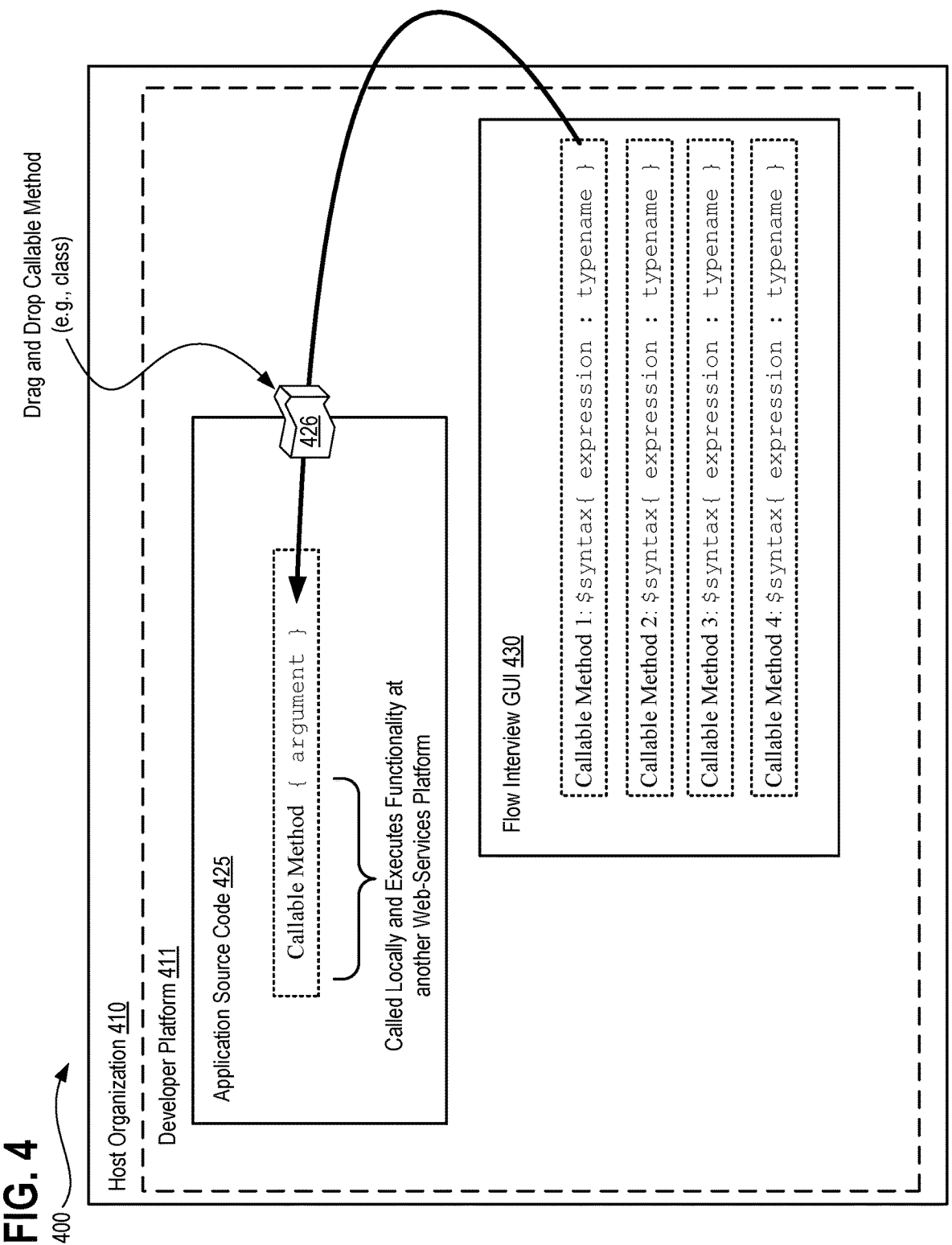
FIG. 4 depicts an exemplary flow interview process in accordance with described embodiments.

FIG. 4 depicts an exemplary flow interview process 400 in accordance with described embodiments.

In particular, there is depicted here a host organization 410 having therein application source code 425 which may be displayed or accessed via, for example, a developer's platform 411. Additionally depicted is a flow interview GUI 430 via which a developer may drag and drop any callable method 426, such as the callable methods 1-4 depicted within the class browser portion of the flow interview GUI 430.

According to such an embodiment, the flow interview GUI 430 is a visual programming system permitting developers to drag components together which thus simplifies development and reduces the required technical aptitude required to perform such programming operations.

According to such embodiments, the web service components previously retrieved, parsed, and stored within the database system (refer to FIG. 3 at element 130) as stored method signatures (refer to FIG. 3 at element 389) are visually browse-able via a class browser as well as exposed as classes to, for example, Apex source code developed at the host organization 410. According to certain embodiments, the classes are exposed and visually depicted within a flow interview GUI 430 as well as a process builder.

For instance, when typing in source code it is permissible to reference the class which will auto-populate utilizing conventional programming interfaces once the stored method signatures are saved within the database system and exposed as classes in the manner described previously.

For instance, when programming source code or utilizing the flow interview GUI 430, the system may evaluate each class referenced and identify the class as a locally stored and locally implemented class having the functionality to carry out its defined methods or alternatively, may identify that the class actually is a shell which defines the method names, arguments and argument types but lacks functionality to perform its own methods and instead refers to another web services platform where the functionality resides.

In such an occurrence, upon the identification of an external web service call, the code generator (refer to FIG. 3 at element 393) may rather than pulling in code as it would from a local class, pull in the stored schema information from the parsed method signature such that at runtime, the external functionality may actually be referenced when needed by the method, thus contacting the external web-service to perform the requested method utilizing the provided arguments.

According to one embodiment, the developer platform 411 enables the developer to control the marshaling process such that the method name, arguments, argument types, and any other parameters are displayable via the application source code 425 or the flow interview GUI 430 and modifiable by the developer. For instance, a developer utilizing SOAP (Simple Object Access Protocol) may modify the proposed default data types or change the parameters, move the parameters, and so forth, although because the developer platform and flow interview GUI 430 populates defaults for the developer, it is therefore optional to make such changes.

In other embodiments such elements are restricted from view from the developer for the sake of maintaining simplicity. According to a particular embodiment, there is a basic and an advanced view of the same developer platform 411 in which the advance view permits modification of the marshalling process including changing data types and parameter names and positions, etc.

According to a particular embodiment, a code generator temporarily generates the code and displays the code within the application source code 425 viewer of the developer platform 411 for viewing by the user or developer and subsequently discards the temporarily generated code after the developer platform 411 is closed. According to such an embodiment, the reference to the specified callable method is saved within the application code base created by the developer using the developer platform 411 and if changes are made to the default marshalling parameters then such alterations are also saved, however, any remaining code which performs the communication over the web to the external web service is not persisted as such code will be generated via JIT compilation or on-the-fly in accordance with such embodiments.

In accordance with one embodiment the functionality and applications provided by the external web services platform are utilized to form locally stored and persisted external service classes corresponding to the method signatures persisted at the database system of the host organization, for instance, as generated by a code generator at the host organization 410.

According to one embodiment, every external service registered via an Integrations GUI causes a Base Platform Object (BPO) to be stored within the database system which defines the external service interface. According to such embodiments, the BPO is then exposed to Apex as a dynamically generated class which is then browse-able and discoverable for other users via the flow interview GUI 430 as well as a process builder. According to such embodiments, the external services are registered through the integrations GUI and then the BPO records are created when the parser parses the schema.

In such embodiments, a service definition object tracks the corresponding generated apex class name(s) in the database system and for every action selected by an admin, a method is added in the generated service class.

According to described embodiments, an exemplary persisted method signature or external service definition is provided as follows:

```
/* Hidden from the organization */
class CreditService {
    public boolean runCreditCheck(String ssn, Integer
        leastExpectedScore) {
        /* 1. Read service definition */
        /* 2. Serialize input parameters */
        /* 3. Invoke the actual web service */
        /* 4. Deserialize response into return value */
    }
    public Integer getCreditScore(String ssn) {
        /* 1. Read service definition */
        /* 2. Serialize input parameters */
        /* 3. Invoke the actual web service */
        /* 4. Deserialize response into return value */
    }
}
```

According to described embodiments, an exemplary persisted method signature or external service invocation is further provided as follows:

```
Service Invocation:
    CreditService service = new CreditService( );
    Boolean result = service.runCreditCheck(ssn, 850,
        4985874, 4995485);
```

According to such embodiments, when a new action is defined through a developer UI such as the developer platform 411, it is added as a new method in the generated class. Moreover, adding a method is backward compatible with existing code. Further still, modifying any existing action, such as by adding or removing parameters, will be triggered only by a developer platform 411 action so as to avoid breaking existing code which references that remote service.

According to particular embodiments, generated classes are public but not global and thus, an organization consuming a managed package does not directly invoke a service class defined by the package so as to avoid naming conflicts amongst remote services.

Discoverable actions in flow builder and process builder include apex methods to be pulled into a flow definition. Therefore, each action of a registered external service causes a wrapper class with the method to be generated. Such discoverable actions are exposed in the flow builder and process builder.

Consider the following exemplary code sample for calling referencing an externally hosted web service to retrieve credit information, as follows:

```
public class GetCreditScoreAction {
    @InvocableMethod
    public List<ActionOutput>
        getCreditScore(List<ActionInput> inputs) {
        CreditService service = new CreditService( );
        service.getCreditScore(inputs.get(0).ssn);
    }
}
public class ActionInput {
    @InvocableVariable String ssn;
}
public class ActionOutput {
    @InvocableVariable Integer score;
}
}
public class RunCreditCheckAction {
    @InvocableMethod
    public ActionOutput runCreditCheck(List<ActionInput>
        inputs) {
        CreditService service = new CreditService( );
        service.runCreditCheck(inputs.get(0).ssn,
            inputs.get(0).leastExpectedScore);
    }
public class ActionInput {
    @InvocableVariable String ssn;
    @InvocableVariable Integer leastExpectedScore;
}
public class ActionOutput {
    @InvocableVariable boolean result;
    }
}
```

Figure 5:
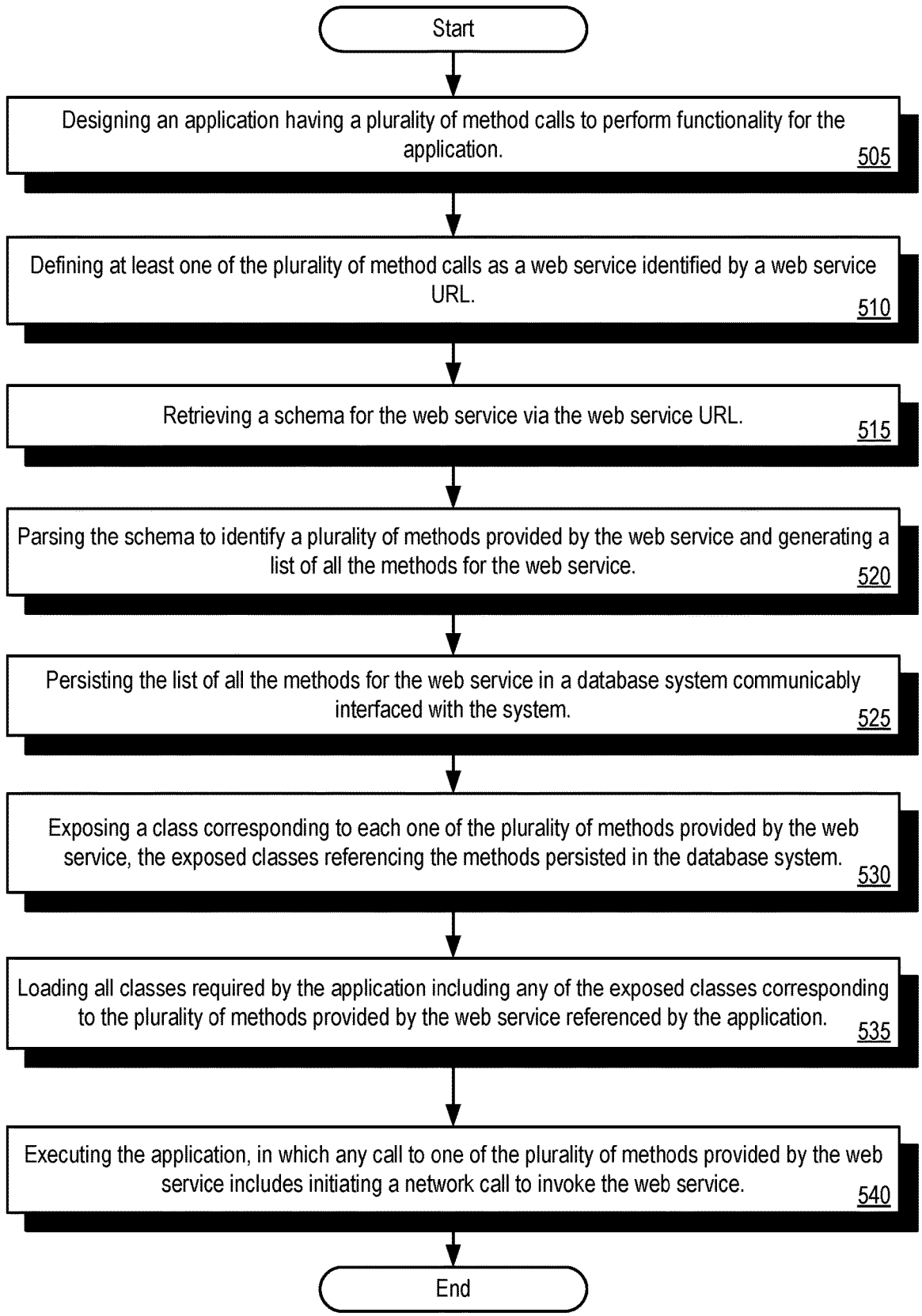
FIG. 5 depicts a flow diagram illustrating a method for implementing schema-driven on-the-fly code generation within a cloud based computing environment in accordance with disclosed embodiments.

FIG. 5 depicts a flow diagram illustrating a method 500 for implementing schema-driven on-the-fly code generation within a cloud based computing environment in accordance with disclosed embodiments. Method 500 may be performed by processing logic that may include hardware (e.g., circuitry, dedicated logic, programmable logic, microcode, etc.), software (e.g., instructions run on a processing device)

to perform various operations such as designing, defining, retrieving, parsing, persisting, exposing, loading, executing, operating, receiving, generating, storing, maintaining, creating, returning, presenting, interfacing, communicating, transmitting, querying, processing, providing, determining, triggering, displaying, updating, sending, etc., in pursuance of the systems and methods as described herein. For example, the hosted computing environment 111, the web-services bridge 190, and its database system 130 as depicted at FIG. 1, the database system 130 as depicted at FIGS. 2 and 3, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 500 depicted at FIG. 5, at block 505, processing logic designs an application having a plurality of method calls to perform functionality for the application.

At block 510, processing logic defines at least one of the plurality of method calls as a web service identified by a web service URL.

At block 515, processing logic retrieves a schema for the web service via the web service URL.

At block 520, processing logic parses the schema to identify a plurality of methods provided by the web service and generates a list of all the methods for the web service.

At block 525, processing logic persists the list of all the methods for the web service in a database system communicably interfaced with the system.

At block 530, processing logic exposes a class corresponding to each one of the plurality of methods provided by the web service, the exposed classes referencing the methods persisted in the database system.

At block 535, processing logic loads all classes required by the application including any of the exposed classes corresponding to the plurality of methods provided by the web service referenced by the application.

At block 540, processing logic executes the application, in which any call to one of the plurality of methods provided by the web service includes initiating a network call to invoke the web service.

According to another embodiment of method 500, the application includes a locally hosted web service to execute at the system; and in which executing the application includes executing the locally hosted web service at the system to publically expose the locally hosted web service via a public Internet.

According to another embodiment of method 500, the system includes a first web services platform to execute the locally hosted web service; and in which the service identified by the web service URL includes an externally hosted web service executing at a second web services platform distinct from the first web services platform.

According to another embodiment of method 500, retrieving the schema for the web service via the web service URL includes retrieving a published schema for the web service from an external web services platform identified via the web services URL.

According to another embodiment of method 500, the system implements a first cloud computing platform hosting a plurality of web services; in which the web service via the web service URL executes at a second cloud computing platform hosting the web service at a location identified via the web service URL, the first and second cloud computing platforms each provided by different and remote web services platforms; and in which retrieving the schema for the web service via the web service URL includes a web-services bridge executing via the processor at the first cloud computing platform retrieving the schema for the web service via the web service URL from the second cloud computing platform.

According to another embodiment of method 500, the system hosts a force.com compatible web services platform providing a plurality of web services; and in which the web service via the web service URL executes at a second cloud computing platform hosting a Heroku compatible web services platform at a location identified via the web service URL.

According to another embodiment of method 500, parsing the schema to identify the plurality of methods provided by the web service further includes: parsing the schema to identify one or more of permitted arguments, permitted parameters, and/or permitted data types to be passed with each of the plurality of methods identified as being provided by the web service.

According to another embodiment, method 500, further includes: passing the one or more of permitted arguments, permitted parameters, and/or permitted data types to the web service when initiating the network call to invoke the web service at the location identified by the web service URL to perform the functionality required by the method defined as the web service.

According to another embodiment of method 500, persisting the list of all the methods for the web service in the database system includes every one of the identified methods of the web service as a Base Platform Object (BPO) within the database system; in which each method is represented by a corresponding one BPO within the database system.

According to another embodiment, method 500, further includes: persisting a single BPO object encapsulating the schema as retrieved in its entirety and in its original form.

According to another embodiment, method 500, further includes: persisting the schema as retrieved in its entirety and in its original form within the database system amongst a plurality of additional schemas corresponding to other applications at the system having defined method calls identified by other web services; retrieving the schema for the web service in its original form from the database system with the schemas for the other web services; re-parsing all retrieved schemas to identify all methods provided by all of the web services corresponding to the schemas; persisting all identified methods within the database system; re-creating new classes corresponding to all of the identified methods; and exposing the new classes.

According to another embodiment of method 500, the new classes re-created are one of: new classes to replace any classes previously created and exposed for the methods provided by all of the web services corresponding to the schemas; or new classes in a different format than the classes previously created and exposed for the methods provided by all of the web services corresponding to the schemas.

According to another embodiment, method 500, further includes: periodically re-retrieving the schema for the web service from web services platform hosting the web service at a location identified via the web service URL; re-parsing the re-retrieved schema; replacing the persisted methods for the web service in the database system based on the methods re-parsed from the re-retrieved schema; re-exposing all classes corresponding to each one of the plurality of methods provided by the web service, the exposed classes referencing the replaced methods persisted in the database system; and in which executing the application includes referencing the re-exposed classes which reference the replaced persisted methods for the web service in the database system.

According to another embodiment of method 500, exposing the class corresponding to each one of the plurality of methods provided by the web service includes one or more of: making the exposed classes discoverable to source code programming interface which auto-populates class references based on typed input; making the exposed classes discoverable to a class browser; making the exposed classes discoverable to a flow interview GUI having a drag and drop capability to add any of the exposed classes to the application via a drag and drop action at the flow interview GUI.

According to another embodiment, method 500, further includes: temporarily generating code required to call the invoke the network call to the web service at the location identified by the web service URL to perform the functionality required by the method defined as the web service; displaying the temporarily generated code to the flow interview GUI responsive to a class corresponding to a method of the web service being added to the application via the drag and drop action at the flow interview GUI; and discarding the temporarily generated code subsequent to a user exiting the flow interview GUI.

According to another embodiment of method 500, persisting the list of all the methods for the web service in the database system includes: storing each method name for the methods of the web service in the database system as a database record; storing any permissible parameter, argument, and data type for each of the methods with the corresponding database record; storing the location of the method as identified via the web service URL with the corresponding database record; and in which the database system lacks any implementation functionality to perform the methods for the web service and calls the web service via a network call to perform the functionality of the methods of the web service when the respective methods of the web service are invoked at runtime of the application.

According to another embodiment, method 500, further includes: receiving a response from the web service called via the network call at the web service URL; and returning the response as the return value to the application responsive to the method being invoked by the application at runtime.

According to another embodiment, method 500, further includes: defining at least a second one of the plurality of method calls as a locally stored class stored within the database system and having functionality to perform the at least second one of the plurality of methods; in which the method defined as the web service at the web service URL corresponds to a class stored within the database system lacking any functionality to perform the method of the web service; and in which loading all of the classes required by the application includes loading the exposed class corresponding the web service referenced by the application by compiling the class into an executable for the application with dynamically generated code to invoke the network call to the web service at the location identified by the web service URL to perform the functionality required by the method defined as the web service; and in which the loading further includes compiling the locally stored class into the executable for the application with dynamically generated code to invoke functionality stored within the locally stored class to perform the method of the locally stored class.

According to another embodiment of method 500, loading all of the classes required by the application includes performing Just-In-Time or (JIT) compilation to generate all required callable methods or classes, in which the JIT compilation includes generating code to invoke the network call to the web service at the location identified by the web service URL to perform the functionality required by the method defined as the web service.

According to another embodiment, method 500, further includes: caching the generated code at the system temporarily, in which the generated code is not persisted to the database system; and discarding the generated code from cache.

According to another embodiment of method 500, the system includes a multi-tenant database system having customer data stored therein for a plurality of distinct customer organizations; in which designing the application includes creating an application responsive to inputs received from a client device associated with one of the plurality of customer organizations operating remote from the system; in which the client device associated with one of the plurality of customer organizations operating remote from the system communicably interface with the system via a public Internet; and in which each customer organization is an entity selected from the group consisting of: a separate and distinct remote organization, an organizational group within the host organization, a business partner of the host organization, or a customer organization that subscribes to cloud computing services provided by the host organization.

According to another embodiment of method 500, a user interface operates at a user client device remote from the system and communicatively interfaces with the system via a public Internet; in which the system operates at a host organization as a cloud based service provider to the user client device; in which the cloud based service provider hosts request interface exposed to the user client device via the public Internet, in which the request interface receives inputs from the client device to design the application as a request for services from the cloud based service provider.

In accordance with a particular embodiment, there is a non-transitory computer readable storage media having instructions stored thereon that, when executed by a processor of a system, the instructions cause the system to perform operations including: designing an application having a plurality of method calls to perform functionality for the application; defining at least one of the plurality of method calls as a web service identified by a web service URL; retrieving a schema for the web service via the web service URL; parsing the schema to identify a plurality of methods provided by the web service and generating a list of all the methods for the web service; persisting the list of all the methods for the web service in a database system communicably interfaced with the system; exposing a class corresponding to each one of the plurality of methods provided by the web service, the exposed classes referencing the methods persisted in the database system; loading all classes required by the application including any of the exposed classes corresponding to the plurality of methods provided by the web service referenced by the application; and executing the application, in which any call to one of the plurality of methods provided by the web service includes initiating a network call to invoke the web service.

Figure 6:
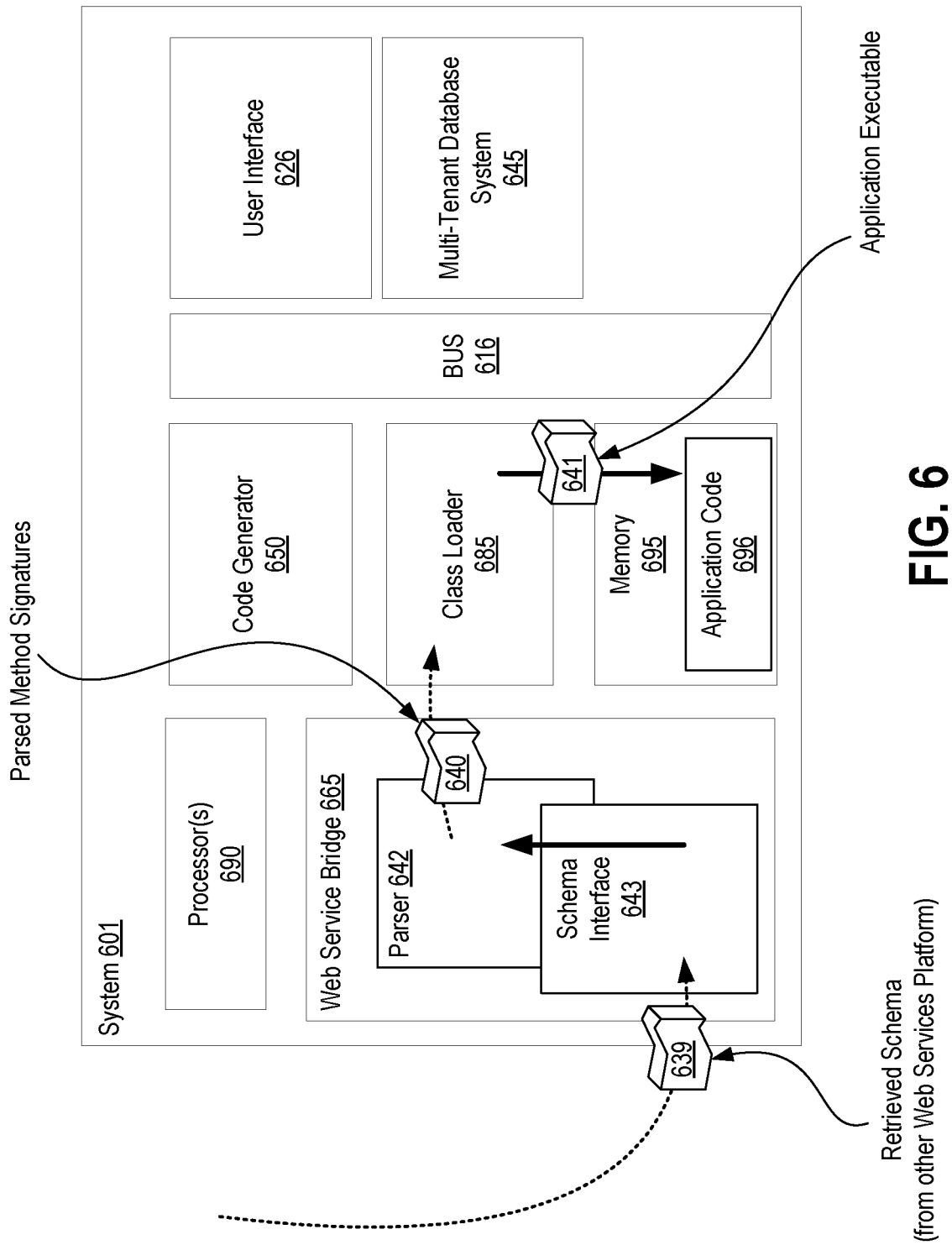
FIG. 6 shows a diagrammatic representation of a system within which embodiments may operate, be installed, integrated, or configured.

FIG. 6 shows a diagrammatic representation of a system 601 within which embodiments may operate, be installed, integrated, or configured. In accordance with one embodiment, there is a system 601 having at least a processor 690 and a memory 695 therein to execute implementing application code 696. Such a system 601 may communicatively interface with and cooperatively execute with the benefit of a hosted computing environment, such as a host organization, a multi-tenant environment, an on-demand service provider, a cloud based service provider, a client-server environment, etc.

According to the depicted embodiment, the system 601, which may operate within a host organization, includes the processor 690 and the memory 695 to execute instructions at the system 601. According to such an embodiment, the system 601 further includes: a web service bridge 665 to receive design inputs to design an application 641 having a plurality of method calls to perform functionality for the application 641; in which the application is to define at least one of the plurality of method calls as a web service identified by a web service URL; a schema interface 643 to retrieve a schema 639 for the web service via the web service URL; a parser 642 to parse the schema 639 to identify a plurality of methods (e.g., parsed method signatures 640) provided by the web service; a code generator 650 to generate a list of all the methods for the web service; a database system 645 to persist the list of all the methods for the web service; the web services bridge 665 to expose a class corresponding to each one of the plurality of methods provided by the web service, the exposed classes referencing the methods persisted in the database system; the code generator 650 or the class loader 685 to load all classes required by the application including any of the exposed classes corresponding to the plurality of methods provided by the web service referenced by the application; and the web services bridge 665 to execute the application 641, in which any call to one of the plurality of methods provided by the web service includes initiating a network call to invoke the web service.

According to another embodiment of the system 601, a user interface 626 operates at a user client device remote from the system and communicatively interfaces with the system via a public Internet; in which the system operates at a host organization as a cloud based service provider to the user client device; in which the cloud based service provider hosts request interface exposed to the user client device via the public Internet, in which the request interface receives inputs from the client device to design the application as a request for services from the cloud based service provider.

Bus 616 interfaces the various components of the system 601 amongst each other, with any other peripheral(s) of the system 601, and with external components such as external network elements, other machines, client devices, cloud computing services, etc. Communications may further include communicating with external devices via a network interface over a LAN, WAN, or the public Internet.

Figure 7A:
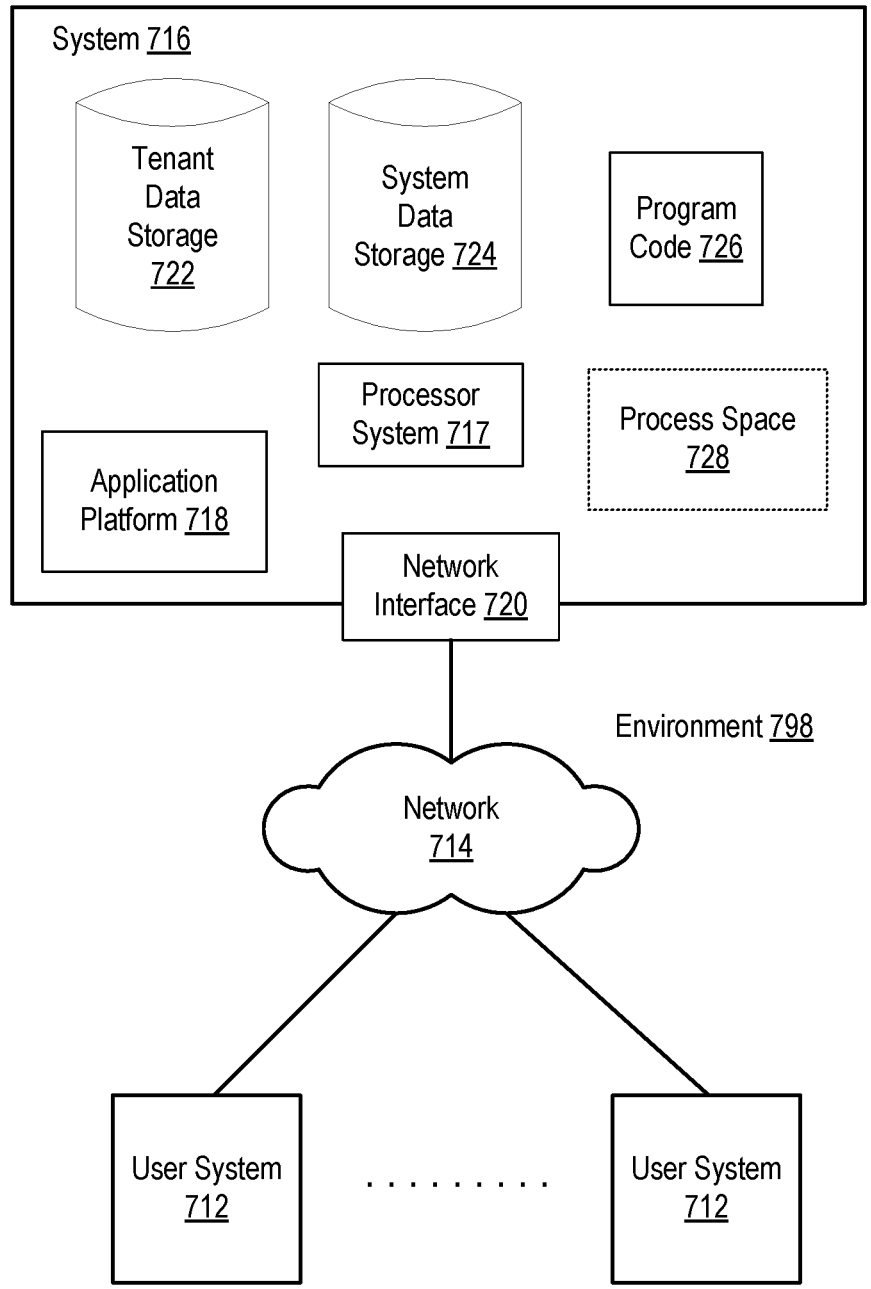
FIG. 7A illustrates a block diagram of an environment in which an on-demand database service may operate in accordance with the described embodiments.

FIG. 7A illustrates a block diagram of an environment 798 in which an on-demand database service may operate in accordance with the described embodiments. Environment 798 may include user systems 712, network 714, system 716, processor system 717, application platform 718, network interface 720, tenant data storage 722, system data storage 724, program code 726, and process space 728. In other embodiments, environment 798 may not have all of the components listed and/or may have other elements instead of, or in addition to, those listed above.

Environment 798 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in FIG. 7A (and in more detail in FIG. 7B) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" is used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7A, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7A, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7A include conventional, well-known elements that are explained only briefly here. For example, each user system 712 may include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units.

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7B:
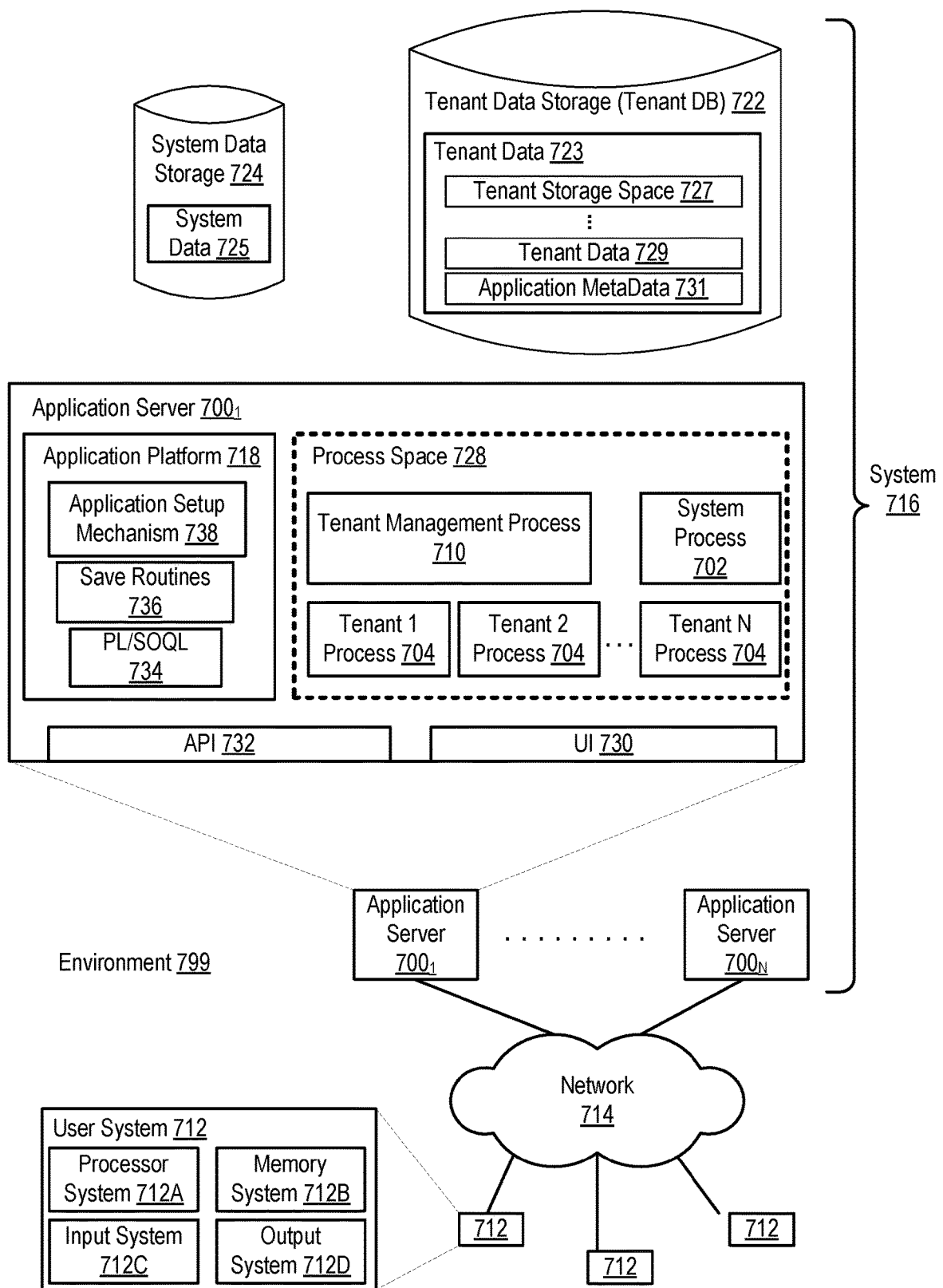
FIG. 7B illustrates another block diagram of an embodiment of elements of FIG. 7A and various possible interconnections between such elements in accordance with the described embodiments.

FIG. 7B illustrates another block diagram of an embodiment of elements of FIG. 7A and various possible interconnections between such elements in accordance with the described embodiments. FIG. 7B also illustrates environment 799. However, in FIG. 7B, the elements of system 716 and various interconnections in an embodiment are illustrated in further detail. More particularly, FIG. 7B shows that user system 712 may include a processor system 712A, memory system 712B, input system 712C, and output system 712D. FIG. 7B shows network 714 and system 716. FIG. 7B also shows that system 716 may include tenant data storage 722, having therein tenant data 723, which includes, for example, tenant storage space 727, tenant data 729, and application metadata 731. System data storage 724 is depicted as having therein system data 725. Further depicted within the expanded detail of application servers 700$_{1-N}$ are User Interface (UI) 730, Application Program Interface (API) 732, application platform 718 includes PL/SOQL 734, save routines 736, application setup mechanism 738, process space 728 includes system process space 702, tenant 1-N process spaces 704, and tenant management process space 710. In other embodiments, environment 799 may not have the same elements as those listed above and/or may have other elements instead of, or in addition to, those listed above.

User system 712, network 714, system 716, tenant data storage 722, and system data storage 724 were discussed above in FIG. 7A. As shown by FIG. 7B, system 716 may include a network interface 720 (of FIG. 7A) implemented as a set of HTTP application servers 700, an application platform 718, tenant data storage 722, and system data storage 724. Also shown is system process space 702, including individual tenant process spaces 704 and a tenant management process space 710. Each application server 700 may be configured to tenant data storage 722 and the tenant data 723 therein, and system data storage 724 and the system data 725 therein to serve requests of user systems 712. The tenant data 723 might be divided into individual tenant storage areas (e.g., tenant storage space 727), which can be either a physical arrangement and/or a logical arrangement of data. Within each tenant storage space 727, tenant data 729, and application metadata 731 might be similarly allocated for each user. For example, a copy of a user's most recently used (MRU) items might be stored to tenant data 729. Similarly, a copy of MRU items for an entire organization that is a tenant might be stored to tenant storage space 727. A UI 730 provides a user interface and an API 732 provides an application programmer interface into system 716 resident processes to users and/or developers at user systems 712. The tenant data and the system data may be stored in various databases, such as one or more Oracle™ databases.

Application platform 718 includes an application setup mechanism 738 that supports application developers' creation and management of applications, which may be saved as metadata into tenant data storage 722 by save routines 736 for execution by subscribers as one or more tenant process spaces 704 managed by tenant management process space 710 for example. Invocations to such applications may be coded using PL/SOQL 734 that provides a programming language style interface extension to API 732. Invocations to applications may be detected by one or more system processes, which manages retrieving application metadata 731 for the subscriber making the invocation and executing the metadata as an application in a virtual machine.

Each application server 700 may be communicably coupled to database systems, e.g., having access to system data 725 and tenant data 723, via a different network connection. For example, one application server 700i might be coupled via the network 714 (e.g., the Internet), another application server 700N-1 might be coupled via a direct network link, and another application server 700N might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 712 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user may hit three different application servers 700, and three requests from different users may hit the same application server 700. In this manner, system 716 is multi-tenant, in which system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 700 to request and update system-level and tenant-level data from system 716 that may require sending one or more queries to tenant data storage 722 and/or system data storage 724. System 716 (e.g., an application server 700 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 8 illustrates a diagrammatic representation of a machine 800 in the exemplary form of a computer system, in accordance with one embodiment, within which a set of instructions, for causing the machine/computer system 800 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 818 (e.g., a persistent storage device including hard disk drives and a persistent database and/or a multi-tenant database implementation), which communicate with each other via a bus 830. Main memory 804 includes a web services bridge 824 and a schema interface 825 and a parser 823 by which to communicate with another web services platform, retrieve, and parse a schema to identify methods provided by the web service at the other web services platform in accordance with described embodiments. Main memory 804 and its sub-elements are operable in conjunction with processing logic 826 and processor 802 to perform the methodologies discussed herein.

Processor 802 represents one or more general-purpose processing devices such as a microprocessor, central processing unit, or the like. More particularly, the processor 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 802 may also be one or more special-purpose processing devices such as an application specific integrated circuit (ASIC), a field programmable gate array (FPGA), a digital signal processor (DSP), network processor, or the like. Processor 802 is configured to execute the processing logic 826 for performing the operations and functionality which is discussed herein.

The computer system 800 may further include a network interface card 808. The computer system 800 also may include a user interface 810 (such as a video display unit, a liquid crystal display, etc.), an alphanumeric input device 812 (e.g., a keyboard), a cursor control device 814 (e.g., a mouse), and a signal generation device 816 (e.g., an integrated speaker). The computer system 800 may further include peripheral device 836 (e.g., wireless or wired communication devices, memory devices, storage devices, audio processing devices, video processing devices, etc.).

The secondary memory 818 may include a non-transitory machine-readable storage medium or a non-transitory computer readable storage medium or a non-transitory machine-accessible storage medium 831 on which is stored one or more sets of instructions (e.g., software 822) embodying any one or more of the methodologies or functions described herein. The software 822 may also reside, completely or at least partially, within the main memory 804 and/or within the processor 802 during execution thereof by the computer system 800, the main memory 804 and the processor 802 also constituting machine-readable storage media. The software 822 may further be transmitted or received over a network 820 via the network interface card 808.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system of a host organization, the system having at least a processor and a memory therein, wherein the method comprises:

retrieving a schema from a remote web services platform and parsing the schema to identify available method signatures within the schema defining one or more of permitted arguments, permitted parameters, and permitted data types to be passed with methods provided by the remote web services platform;

writing a callable native and local class into a database system of the host organization by storing a database record in the database system for each of the methods provided, each database record defining (i) a method name, (ii) any permissible parameter, argument, and data type, and (iii) the location of the method;

generating a class structure for each callable native and local class having code therein which permits the methods at the remote web services platform corresponding to the available method signatures identified to be called as the native and local class by instantiating communications to the remote web services platform when called;

representing a complete class to a class browser for each of the callable native and local classes, wherein the database system lacks any implementation functionality to perform the methods and calls the remote web services platform via a network call to perform the functionality of the methods when the respective methods are invoked at runtime of the application;

designing an application by selecting at a GUI, one or more of the callable native and local classes to perform functionality for the application; and executing the application, wherein any call to the callable native and local classes by the application comprises calling one of the callable native and local classes stored within the database record in the database system as the native and local class invoking the functionality at the remote web services platform corresponding to the native and local class called by the application.

2. The method of claim 1:
wherein the application comprises a locally hosted web service to execute at the system; and
wherein executing the application comprises executing the locally hosted web service at the system to publicly expose the locally hosted web service via a public Internet.

3. The method of claim 2:
wherein the system comprises a first web services platform to execute the locally hosted web service; and
wherein the callable native and local classes provided by the remote web services platform are implemented by an externally hosted web service executing at a second web services platform distinct from the first web services platform.

4. The method of claim 1, wherein retrieving the schema from the remote web services platform comprises retrieving a published schema for the web service from an external web services platform identified via a web services URL pointing to the location of each respective method.

5. The method of claim 1:
wherein the system implements a first cloud computing platform hosting a plurality of web services;
wherein the methods provided by the remote web services platform execute at a second cloud computing platform hosting the web service at a location identified via a web service URL pointing to the location of the methods, the first and second cloud computing platforms each provided by different and remote web services platforms; and
wherein the system comprises a web-services bridge executing via the processor at the first cloud computing platform for retrieving the schema from the remote web services platform via the web service URL from the second cloud computing platform.

6. The method of claim 1:
wherein the system hosts a force.com compatible web services platform providing a plurality of web services; and
wherein the methods provided by the remote web services platform execute at a second cloud computing platform hosting a Heroku compatible web services platform at a location identified via a web service URL pointing to the location of the methods.

7. The method of claim 1, further comprising:
passing, for each of the methods provided by the remote web services platform, the method name, the permissible parameters, arguments, and data types, and the location of the method when initiating the network call to invoke the respective method provided by the remote web services platform.

8. The method of claim 1:
wherein writing the callable native and local class into the database system of the host organization by storing the database record in the database system comprises persisting a list of all the methods provided by the remote web services platform as a Base Platform Object (BPO) within the database system;
wherein each method is represented by a corresponding one BPO within the database system; and
wherein the method further comprises persisting a single BPO object encapsulating the schema as retrieved in its entirety and in its original form.

9. The method of claim 1, further comprising:
persisting the schema as retrieved in its entirety and in its original form within the database system amongst a plurality of additional schemas corresponding to other applications at the system having defined method calls identified by different methods provided by other remote web services platforms;
wherein retrieving the schema from the remote web services platform comprises retrieving the schema in its original form from the database system with retrieval of the schemas of the other remote web services platforms;
re-parsing all retrieved schemas to identify all methods provided by all of the web services corresponding to the schemas;
persisting all identified methods within the database system;
re-creating new classes corresponding to all of the identified methods; and
exposing the new classes.

10. The method of claim 9, wherein the new classes re-created are one of:
new classes to replace any classes previously created and exposed for the methods provided by any of the web services corresponding to the schemas; or
new classes in a different format than the classes previously created and exposed for any of the methods provided by the methods provided by the web services corresponding to the schemas.

11. The method of claim 1, further comprising:
periodically re-retrieving the schema from the remote web services platform at the location defined within the database record corresponding to a web service URL;
re-parsing the re-retrieved schema;
replacing the callable native and local class by overwriting or updating the database record in the database system corresponding to each respective method based on the methods re-parsed from the re-retrieved schema;

re-exposing all callable native and local classes corresponding to each of the methods provided by the remote web services platform by representing to the class browser the callable native and local classes pursuant to the overwriting or updating of the database record in the database system for each respective method; and wherein executing the application comprises referencing the re-exposed callable native and local classes which reference the replacement methods provided by the remote web services platform in the database system.

12. The method of claim 1, wherein representing the complete class to the class browser for each of the callable native and local classes corresponding to the methods provided by the remote web services platform comprises one or more of:

exposing each of the callable native and local classes to be discoverable to a source code programming interface which auto-populates class references based on typed input;

exposing each of the callable native and local classes to be discoverable to the class browser;

exposing each of the callable native and local classes to be discoverable to a flow interview GUI having a drag and drop capability to add any of the exposed callable native and local classes to the application via a drag and drop action at the flow interview GUI.

13. The method of claim 12, further comprising:

temporarily generating code required to invoke the network call to the remote web services platform at the location defined within the database record corresponding to a web service URL to perform the functionality required by the method;

displaying the temporarily generated code to the flow interview GUI responsive to one of the callable native and local classes corresponding to a method provided by the remote web services platform being added to the application via the drag and drop action at the flow interview GUI; and discarding the temporarily generated code subsequent to a user exiting the flow interview GUI.

14. The method of claim 1, further comprising:

receiving a response from the remote web services platform called via the network call at the location defined within the database record corresponding to a web service URL; and returning the response as a return value to the application responsive to the method being invoked by the application at runtime.

15. The method of claim 1, further comprising:

loading any classes required by the application, wherein the loading comprises loading the callable native and local classes exposed to the application by compiling the classes required into an executable for the application with dynamically generated code to invoke the network call to the remote web services platform at the location defined within the database record corresponding to a web service URL to perform the functionality required by the method; and wherein the loading further comprises compiling any required locally stored class into the executable for the application with the dynamically generated code compiled to invoke the network call to the remote web services platform.

16. The method of claim 1, further comprising:

loading any classes required by the application, wherein the loading comprises performing Just-In-Time or (JIT) compilation to generate all required callable methods or classes, wherein the JIT compilation includes generating code to invoke the network call to the remote web services platform at the location defined by the database record corresponding to a web service URL to perform the functionality of the method provided by the remote web services platform.

17. The method of claim 16, further comprising:

caching the generated code at the system temporarily, wherein the generated code is not persisted to the database system; and discarding the generated code from cache.

18. The method of claim 1:

wherein the system comprises a multi-tenant database system having customer data stored therein for a plurality of distinct customer organizations;

wherein designing the application comprises creating the application responsive to inputs received from a client device associated with one of the plurality of customer organizations operating remote from the system;

wherein the client device associated with one of the plurality of customer organizations operating remote from the system communicably interface with the system via a public Internet; and wherein each customer organization is an entity selected from the group consisting of: a separate and distinct remote organization, an organizational group within the host organization, a business partner of the host organization, or a customer organization that subscribes to cloud computing services provided by the host organization.

19. The method of claim 1:

wherein a user interface operates at a user client device remote from the system and communicatively interfaces with the system via a public Internet;

wherein the system operates at a host organization as a cloud based service provider to the user client device; and wherein the cloud based service provider hosts a request interface exposed to the user client device via the public Internet, wherein the request interface receives inputs from the client device to design the application as a request for services from the cloud based service provider.

20. A system comprising:

a memory to store instructions;

a processor to execute the instructions stored within the memory;

a network connected web services bridge communicably interfacing the system with a remote web services platform;

wherein the web services bridge is to further retrieve a schema from a remote web services platform and parsing the schema to identify available method signatures within the schema defining one or more of permitted arguments, permitted parameters, and permitted data types to be passed with methods provided by the remote web services platform;

a parser to write a callable native and local class into a database system of the host organization by storing a database record in the database system for each of the methods provided, each database record defining (i) a method name, (ii) any permissible parameter, argument, and data type, and (iii) the location of the method;

wherein the web services bridge is to further generate a class structure for each callable native and local class having code therein which permits the methods at the remote web services platform corresponding to the available method signatures identified to be called as the native and local class by instantiating communications to the remote web services platform when called;

wherein the web services bridge is to further represent a complete class to a class browser for each of the callable native and local classes, wherein the database system lacks any implementation functionality to perform the methods and calls the remote web services platform via a network call to perform the functionality of the methods when the respective methods are invoked at runtime of the application;

a developer platform to design an application by selecting at a GUI, one or more of the callable native and local classes to perform functionality for the application; and wherein the host organization is to execute the application, wherein any call to the callable native and local classes by the application comprises calling one of the callable native and local classes stored within the database record in the database system as the native and local class invoking the functionality at the remote web services platform corresponding to the native and local class called by the application.

21. The system of claim 20:

wherein a user interface operates at a user client device remote from the system and communicatively interfaces with the system via a public Internet;

wherein the system operates at a host organization as a cloud based service provider to the user client device; and wherein the cloud based service provider hosts a request interface exposed to the user client device via the public Internet, wherein the request interface is to receive inputs from the client device to design the application as a request for services from the cloud based service provider.

22. Non-transitory computer readable storage media having instructions stored thereon that, when executed by a processor of a system, the instructions cause the system to perform operations including:

retrieving a schema from a remote web services platform and parsing the schema to identify available method signatures within the schema defining one or more of permitted arguments, permitted parameters, and permitted data types to be passed with methods provided by the remote web services platform;

writing a callable native and local class into a database system of the host organization by storing a database record in the database system for each of the methods provided, each database record defining (i) a method name, (ii) any permissible parameter, argument, and data type, and (iii) the location of the method;

generating a class structure for each callable native and local class having code therein which permits the methods at the remote web services platform corresponding to the available method signatures identified to be called as the native and local class by instantiating communications to the remote web services platform when called;

representing a complete class to a class browser for each of the callable native and local classes, wherein the database system lacks any implementation functionality to perform the methods and calls the remote web services platform via a network call to perform the functionality of the methods when the respective methods are invoked at runtime of the application;

designing an application by selecting at a GUI, one or more of the callable native and local classes to perform functionality for the application; and executing the application, wherein any call to the callable native and local classes by the application comprises calling one of the callable native and local classes stored within the database record in the database system as the native and local class invoking the functionality at the remote web services platform corresponding to the native and local class called by the application.

23. The non-transitory computer readable storage media of claim 22:

wherein the system implements a first cloud computing platform hosting a plurality of web services;

wherein the methods provided by the remote web services platform execute at a second cloud computing platform hosting the web service at a location identified via a web service URL pointing to the location of the methods, the first and second cloud computing platforms each provided by different and remote web services platforms;

wherein the system comprises a web-services bridge executing via the processor at the first cloud computing platform for retrieving the schema from the remote web services platform via the web service URL from the second cloud computing platform;

wherein the system hosts a force.com compatible web services platform providing a plurality of web services; and wherein the methods provided by the remote web services platform execute at a second cloud computing platform hosting a Heroku compatible web services platform at a location identified via a web service URL pointing to the location of the methods.

24. The non-transitory computer readable storage media of claim 22, wherein the instructions, when executed by the processor of the system, cause the system to perform operations further comprising:

periodically re-retrieving the schema from the remote web services platform at the location defined within the database record corresponding to a web service URL;

re-parsing the re-retrieved schema;

replacing the callable native and local class by overwriting or updating the database record in the database system corresponding to each respective method based on the methods re-parsed from the re-retrieved schema;

re-exposing all callable native and local classes corresponding to each of the methods provided by the remote web services platform by representing to the class browser the callable native and local classes pursuant to the overwriting or updating of the database record in the database system for each respective method; and wherein executing the application comprises referencing the re-exposed callable native and local classes which reference the replacement methods provided by the remote web services platform in the database system.

25. The non-transitory computer readable storage media of claim 22:

wherein the system comprises a multi-tenant database system having customer data stored therein for a plurality of distinct customer organizations;

wherein designing the application comprises creating the application responsive to inputs received from a client device associated with one of the plurality of customer organizations operating remote from the system;

wherein the client device associated with one of the plurality of customer organizations operating remote from the system communicably interface with the system via a public Internet; and wherein each customer organization is an entity selected from the group consisting of: a separate and distinct remote organization, an organizational group within the host organization, a business partner of the host organization, or a customer organization that subscribes to cloud computing services provided by the host organization.

* * * * *